United States Patent
Beisele et al.

(10) Patent No.: US 11,718,706 B2
(45) Date of Patent: Aug. 8, 2023

(54) COMPOSITIONS FOR USE IN IMPREGNATION OF PAPER BUSHINGS

(71) Applicant: Huntsman Advanced Materials Licensing (Switzerland) GmbH, Basel (CH)

(72) Inventors: Christian Beisele, Müllheim (DE); Hubert Wilbers, Schopfheim (DE); Daniel Baer, Riehen (CH)

(73) Assignee: HUNTSMAN ADVANCED MATERIALS Licensing (Switzerland) GmbH, Basel (CH)

( * ) Notice: Subject to any disclaimer, the term of this patent is extended or adjusted under 35 U.S.C. 154(b) by 0 days.

(21) Appl. No.: 16/980,894

(22) PCT Filed: Feb. 22, 2019

(86) PCT No.: PCT/EP2019/054430
§ 371 (c)(1),
(2) Date: Sep. 15, 2020

(87) PCT Pub. No.: WO2019/174891
PCT Pub. Date: Sep. 19, 2019

(65) Prior Publication Data
US 2021/0024684 A1    Jan. 28, 2021

(30) Foreign Application Priority Data
Mar. 16, 2018    (EP) ..................................... 18162360

(51) Int. Cl.
| C08G 59/22 | (2006.01) |
| C08G 59/42 | (2006.01) |
| C08L 63/00 | (2006.01) |
| D21H 17/52 | (2006.01) |
| H01B 3/52 | (2006.01) |

(52) U.S. Cl.
CPC .......... C08G 59/226 (2013.01); C08G 59/42 (2013.01); C08L 63/00 (2013.01); D21H 17/52 (2013.01); H01B 3/52 (2013.01)

(58) Field of Classification Search
CPC ....... C08G 59/226; C08G 59/42; C08L 63/00; D21H 17/52; H01B 3/52

USPC ......................................................... 525/524
See application file for complete search history.

(56) References Cited

U.S. PATENT DOCUMENTS

| 3,271,509 A | 9/1966 | Calderwood et al. |
| 2014/0125439 A1* | 5/2014 | Esseghir ................. H01B 3/40 336/61 |
| 2014/0148529 A1* | 5/2014 | Ho ........................... H01B 3/40 523/400 |
| 2015/0031789 A1 | 1/2015 | Botti et al. |
| 2017/0051133 A1* | 2/2017 | Gu ........................ H05K 1/0204 |
| 2017/0355848 A1* | 12/2017 | Kuhlmann ............. C08K 5/053 |

FOREIGN PATENT DOCUMENTS

| CN | 103649160 A | 3/2014 | |
| CN | 103703048 A | 4/2014 | |
| EP | 0523001 A1 | 1/1992 | |
| EP | 523001 A1 * | 1/1993 | ............. C08G 59/18 |
| EP | 1798740 A1 | 6/2007 | |
| EP | 1907436 A1 | 4/2008 | |
| JP | 11060696 A * | 3/1999 | ............. C08G 59/50 |
| WO | 2007012577 A1 | 2/2007 | |
| WO | 2017157591 A1 | 9/2017 | |

OTHER PUBLICATIONS

Yoshimura et al., JP 11-060696 A1 machine translation in English, Mar. 2, 1999. (Year: 1999).*
Setiabudi, EP 0523001 A1 machine translation in English, Jan. 13, 1993 (Year: 1993).*

* cited by examiner

*Primary Examiner* — David T Karst
(74) *Attorney, Agent, or Firm* — Huntsman Advanced Materials Licensing (Switzerland) GmbH; Lewis Craft; David Wooten

(57) ABSTRACT

The disclosure relates to a curable mixture for use in impregnation of paper bushings comprising a resin mixture of a bisphenol-A-diglycidylether (BADGE) and a bisphenol-F-diglycidylether (BFDGE), methyltetrahydrophthalic anhydride (MTHPA) as hardener, and an accelerator selected from the group consisting of tertiary alkylamine aminoethylalcohols and corresponding ethers thereof as well as paper bushings impregnated with such mixture and uses of such mixture.

14 Claims, No Drawings

COMPOSITIONS FOR USE IN IMPREGNATION OF PAPER BUSHINGS

CROSS-REFERENCE TO RELATED APPLICATIONS

This application is a National Stage application filed under 35 U.S.C. § 371 of International Application No. PCT/EP2019/054430 filed Feb. 22, 2019 which designated the United States, and which claims priority to European Application No. 18162360.4 filed Mar. 16, 2018. The noted applications are hereby incorporated herein by reference in their entirety.

TECHNICAL FIELD

The present disclosure relates to compositions for use in impregnation of paper bushings, paper bushings impregnated by such compositions as well as a use of such compositions.

BACKGROUND

Resin impregnated paper (RIP) bushings find use, for example, in high-voltage devices, like high voltage switchgears or transformers.

The conductive core of such a bushing is usually wound with paper, with electroplates being inserted between neighboring paper windings. The curable liquid resin/hardener mixture is then introduced into the assembly for impregnation of the paper and cured subsequently.

There are numerous patents related to such RIP bushings, for example, EP 1 798 740 A1.

U.S. Pat. No. 3,271,509 A describes electrical insulating material and bushings comprising layers of cellulosic sheet material containing 0.02-10 wt. % of a mixture of melamine and dicyandiamide, wherein the ratio of melamine:dicyandiamide is 1-5:1-4, bound together with an infusible mass resulting from the reaction of an epoxy resin with 10-60 parts maleic anhydride crosslinking agent per 100 parts epoxy resin, wherein the epoxy resin preferably is 3,4-epoxy-6-methylcyclohexylmethyl-3,4-epoxy-methylcyclohexane-carboxylate or dicyclopentadiene dioxide. Other crosslinking-agents may, for example, be dodecenylsuccinic, trimellitic or hexahydrophthalic anhydrides. This impregnation system, however, is rather expensive.

US 2015/0031789 A1 relates to a composite material for use in high-voltage devices having a high-voltage electrical conductor, at least partially for grading an electrical field of the high-voltage electrical conductor, and comprises a polymeric matrix and fibers embedded therein.

It is also known to use mixtures of a bisphenol-A-diglycidylether (BADGE), methylhexahydrophthalic anhydride (MHHPA) and benzyldimethylamine (BDMA) for the production of RIP bushings.

Another known system for the production of RIP bushings is based on a BADGE, admixed with a hardener composition containing hexahydrophthalic anhydride (HHPA) and MHHPA.

For health and environmental reasons, it is, however, desired to have an impregnating system free of MHHPA, which is classified as SVHC (Substance of Very High Concern) in the REACH Regulations.

OBJECT OF THE DISCLOSURE

The object underlying the present disclosure is to provide an impregnating material for the impregnation of paper bushings, in particular for high-voltage applications, being free of MHHPA and any other materials labeled as toxic substances, however, maintaining the same positive characteristics as known systems, e.g. a Tg of 100-130° C., a similar mechanical strength, a tan delta at 50 Hz of <0.3% at 23° C., a viscosity of <800 mPas at 23° C. and <250 mPas at 40° C. and being available at a similar cost level.

DISCLOSURE

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

The phrase "substantially free" shall be used herein to mean present in an amount less than 1 weight percent, or less than 0.1 weight percent, or less than 0.01 weight percent, or alternatively less than 0.001 weight percent, based on the total weight of the referenced composition.

As used herein, the term "ambient temperature" refers to the temperature of the surrounding work environment (e.g., the temperature of the area, building or room where the curable composition is used), exclusive of any temperature changes that occur as a result of the direct application of heat to the curable composition to facilitate curing. The ambient temperature is typically between about 10° C. and about 30° C., more specifically about 15° C. and about 25° C. The term "ambient temperature" is used interchangeably with "room temperature" herein.

Turning to the present disclosure, the above-noted problem is solved by a curable mixture comprising a resin mixture of a bisphenol-A-diglycidylether (BADGE) and a bisphenol-F-diglycidylether (BFDGE), methyltetrahydrophthalic anhydride (MTHPA) as hardener, and an accelerator selected from tertiary alkylamine aminoethylalcohols and/or corresponding ethers thereof.

Non-limiting examples of tertiary alkylamine aminoethylalcohols and/or corresponding ethers thereof include N,N,N'-trimethyl-N'-hydroxyethyl-bisaminoethylether, N-(3-dimethylaminopropyl)-N,N-diisopropanolamine, N,N-bis(3-dimethylaminopropyl)-N-isopropanolamine, 2-(2-dimethylaminoethoxy)ethanol, N,N,N'-trimethylaminoethyl-ethanolamine, N,N-dimethyl ethanolamine, or combinations thereof.

In a preferable embodiment, the epoxy index according to ISO 3001 of the BADGE is in the range of 3 to 5 eq/kg, preferably in the range of 3.5 to 4.5 eq/kg.

Preferably, the epoxy index according to ISO 3001 of the BFDGE is in the range of 5 to 6.45 eq/kg, preferably in the range of 5.3 and 6.3 eq/kg.

In one embodiment of the present disclosure, the BADGE and the BFDGE are present in the resin mixture at a weight ratio between 1:10 to 10:1.

In a preferred embodiment, the mixture contains MTHPA in an amount corresponding to 80 wt. % to 120 wt. % of the stoichiometric amount based on the resin mixture, even more preferably, in an amount corresponding to the stoichiometric amount based on the resin mixture. Stoichiometric amount based on the resin mixture means that 1 equivalent of MTHPA is added to 1 equivalent of epoxy resin, i.e., BADGE plus BFDGE.

Preferably, the curable mixture contains the accelerator in an amount of <0.2 pbw based on 100 pbw of the resin mixture, more preferably, in an amount of 0.01 to 0.10 pbw based on 100 pbw of the resin mixture.

In one specific embodiment, the accelerator is selected from N,N,N'-trimethyl-N'-hydroxyethyl-bisaminoethylether, N-(3-dimethylaminopropyl)-N,N-diisopropanolamine, N,N-bis(3-dimethylaminopropyl)-N-isopropanolamine, 2-(2-dimethylaminoethoxy)ethanol, N,N,N'-trimethylaminoethyl-ethanolamine, N,N-dimethylethanolamine, or combinations thereof, and preferably is N,N,N'-trimethyl-N'-hydroxyethyl-bisaminoethyl ether.

The curable mixture of the present disclosure may contain additional components such as, for example, processing aids, defoamers, rheologic additives, wetting agents, colorants and diluents. It is noteworthy that the compositions disclosed are substantially free of fibers including nanofibers.

The present disclosure also relates to a paper bushing impregnated with the presently disclosed composition.

In one embodiment, the paper bushing is a bushing for high-voltage application.

Finally, the present disclosure relates to a use of presently disclosed mixture as an impregnating system for paper bushings, in particular for high-voltage application.

The main feature of the present disclosure is the novel use of MTHPA as a main hardener component in compositions for impregnation of paper bushings. The MTHPA used in the presently disclosed curable mixture may be any isomer of MTHPA or mixtures thereof in a purity of >99%.

Also, one of the main components of the presently disclosed curable mixture is a resin mixture comprising (i) a BADGE with an epoxy index of 3 to 5 eq/kg and (ii) a BFDGE with an epoxy index of 5 to 6.45 eq/kg as the main resin components. As used herein, the term "epoxy index" refers to the number of moles of epoxy groups per kg of resin. In the indicated ranges of epoxy index, the resins contain at least a portion of longer molecules, i.e. molecules having more than one bisphenol unit. This specific selection results in superior characteristics of the cured products, as can be seen in more detail from the examples.

In the context of such compositions, it is preferred to use an accelerator that can be used in amounts low enough not to accelerate the curing and release of exotherm too quickly, but, on the other hand, promotes the cure of the resins and the anhydride to achieve a desired high Tg of between about 100-130° C., more particularly 120 to 130° C. Therefore, a specifically preferred embodiment comprises the use of N,N,N'-trimethyl-N'hydroxyethyl-bisaminoethylether or similar amines, such as, for example, N-(3-dimethylaminopropyl)-N,N-diisopropanolamine, N,N-bis(3-dimethylaminopropyl)-N-isopropanol amine, 2-(2-dimethylaminoethoxy)ethanol, N,N,N'-trimethylaminoethyl-ethanolamine, or N,N-dimethylethanolamine, in an amount of <0.2 pbw based on 100 pbw of resin.

More details and advantages will become obvious from the following examples. The components, which are all available from Huntsman Corporation or an affiliate thereof (The Woodlands, TX), used therein are as follows:

Araldite® MY 740 resin: a BADGE with an epoxy index (ISO 3001) of 5.25 to 5.55 eq/kg Aradur® HY 1102 hardener: MHHPA Accelerator DY 062 accelerator: BDMA XB 5860: Resin formulation based on BADGE, containing between 3-7 wt. % 4,4'-Methylene-bis[N,N-bis(2,3-epoxypropyl)aniline]

Aradur® HY 1235 hardener: Mixture of HHPA and MHHPA

Aradur® HY 918-1 hardener: Mixture of various isomers of MTHPA having a viscosity of 50-80 mPas at 25° C. according to ISO 12058

Araldite® GY 280 resin: a BADGE with an epoxy index (ISO 3001) of 3.57 to 4.45 eq/kg Araldite® GY 281 resin: a bisphenol-F-diglycidylether (BFDGE) with an epoxy index (ISO 3001) of 5.80 to 6.30 eq/kg JEFFCAT® ZF 10 accelerator: N,N,N'-trimethyl-N'-hydroxyethyl-bisamino-ethylether

EXAMPLES

Comparative Example 1
(BADGE/MHHPA/BDMA)

200 g of Araldite® MY 740 resin were put in a metal reactor. Then 180 g of Aradur® HY 1102 hardener and 0.1 g Accelerator DY 062 accelerator were added. The components were then mixed with an anchor stirrer at ambient temperature for about 15 min. Finally, the reactor was subjected to a vacuum to remove all or substantially all bubbles from the mixture.

This mixture was then analyzed to determine its viscosity and gel time.

A portion of the mixture was then cast into molds (preheated to 80° C.) to prepare test specimens for the mechanical and electrical tests.

The molds were treated according to a curing program as indicated in the table below.

After cooling to ambient temperature, Tg, mechanical and electrical properties were determined according to standard procedures as specified hereunder.

Comparative Example 2 (XB 5860/Aradur® HY 1235 Hardener)

200 g of XB 5860 were put in a metal reactor. Then 170 g of Aradur® HY 1235 hardener were added. The components were then mixed with an anchor stirrer at ambient temperature for about 15 min. Finally, the reactor was subjected to a vacuum to remove all or substantially all bubbles from the mixture.

This mixture was then analyzed to determine viscosity and gel time.

A portion of the mixture was then cast into molds (preheated to 80° C.) to prepare test specimens for the mechanical and electrical tests.

The molds were treated according to a curing program as indicated in the table below.

After cooling to ambient temperature, Tg, mechanical and electrical properties were determined according to the same standard procedures as in Comparative Example 1.

Comparative Example 3 (Araldite® MY 740 Resin/Aradur® HY 918-1 Hardener/0.05 pbw BDMA)

200 g of Araldite® MY 740 resin were put in a metal reactor. Then 170 g of Aradur® HY 918-1 hardener and 0.1 g Accelerator DY 062 accelerator were added. The components were then mixed with an anchor stirrer at ambient temperature for about 15 min. Finally, the reactor was subjected to a vacuum to remove all or substantially all bubbles from the mixture.

This mixture was then used to determine viscosity and gel time.

A portion of the mixture was then cast into molds (preheated to 80° C.) to prepare test specimens for the mechanical and electrical tests.

The molds were treated according to a curing program as indicated in the table below.

After cooling to ambient temperature, Tg, mechanical and electrical properties were determined according to the same standard procedures as in Comparative Example 1.

Comparative Example 4 (Araldite® MY 740 Resin/Aradur® HY 918-1 Hardener/0.2 pbw BDMA)

200 g of Araldite® MY 740 resin were put in a metal reactor. Then 170 g of Aradur® HY 918-1 hardener and 0.4 g Accelerator DY 062 accelerator were added. The components were then mixed with an anchor stirrer at ambient temperature for about 15 min. Finally, the reactor was subjected to a vacuum to remove all or substantially all bubbles from the mixture.

This mixture was then used to determine viscosity and gel time.

A portion of the mixture was then cast into molds (preheated to 80° C.) to prepare test specimens for the mechanical and electrical tests.

The molds were treated according to a curing program as indicated in the table below.

After cooling to ambient temperature, Tg, mechanical and electrical properties were determined according to the same standard procedures as in Comparative Example 1.

Example 1

160 g of Araldite® GY 280 resin and 40 g of Araldite® GY 281 resin were put in a metal reactor. Then, 180 g of Aradur® HY 918-1 hardener and 0.14 g JEFFCAT® ZF 10 accelerator were added. The components were then mixed with an anchor stirrer at ambient temperature for about 15 min. Finally, the reactor was subjected to a vacuum to remove all or substantially all bubbles.

This mixture was then used to determine viscosity and gel time.

A portion of the mixture was then cast into molds (preheated to 80° C.) to prepare test specimens for the mechanical and electrical tests.

The molds were treated according to a curing program as indicated in the table below.

After cooling to ambient temperature, Tg, mechanical and electrical properties were determined according to the same standard procedures as in Comparative Example 1.

The formulations as well as the results of the various measurements are shown in the table below.

|  | | Comparison 1 | Comparison 2 | Comparison 3 | Comparison 4 | Inventive 1 |
|---|---|---|---|---|---|---|
|  | MY 740 | 100 | | 100 | 100 | |
|  | HY 1102 | 90 | | | | |
|  | DY 062 | 0.05 | | 0.05 | 0.2 | |
|  | XB 5860 | | 100 | | | |
|  | HY 1235 | | 85 | | | |
|  | GY 281 | | | | | 80 |
|  | GY 280 | | | | | 20 |
|  | HY 918-1 | | | 85 | 85 | 90 |
|  | Jeffcat ZF 10 | | | | | 0.07 |
|  | Critical Requirement | | | | | |
| Viscosity at 25° C./mPas | | <800 | 745 | 600 | 700 | 700 | 680 |
| Viscosity at 40° C./mPas | | <250 | 255 | 160 | | | 126 |
| Geltime | | | | | | | |
| 80° C. | | >10 h | 20 h 58 min | 17 h | 27 h 18 min | 7 h 20 min | 13 h 51 min |
| 120° C. | | >50 min | 1 h 23 min | 2 h | | 28 min | 55 min |
| Cure: | | | 12 h 80° C. + 16 h 130° C. | 6 h/100° C + 12 h/140° C | 12 h 80° C. + 16 h 130° C. | 12 h 80° C. + 24 h 120° C. | 12 h 80° C. + 16 h 130° C. |
| tensile strength/Mpa | | better than comp. 1 | 67 | 45 | | 90 | 96 |
| elongation at break/% | | | 2.7 | 1.4 | | 5.3 | 4.9 |
| Bend Notch | | | | | | | |
| KIC | | better than comp. 1 | 0.59 | 0.75 | | | 0.64 |
| GIC | | | 114 | 95 | | | 117 |
| Tg/° C. | | 120-135 | 123/126 | 125-135 | 104 | 120-130 | 121/123 |
| tan delta (50 Hz, 25° C.) | | <0.3% | 0.34% | 0.40% | | | 0.29% |
| Dielect const (50 Hz, 25° C.) | | | 3.3 | 3.3 | | | 3.3 |
| Contains MHHPA | | no | yes | yes | no | no | no |
| Contains HHPA | | no | no | yes | no | no | no |
| Toxic components | | no | yes | no | yes | yes | no |

Tensile strength and elongation at break were determined at 23° C. according to ISO R527.

Flexural strength were determined at 23° C. according to ISO 178.

$K_{IC}$ (critical stress intensity factor) in MPa·$\sqrt{m}$ and $G_{IC}$ (specific break energy) in J/m2 were determined at 23° C. by bend notch experiment.

Tg was determined according to ISO 6721/94.

Tan delta was measured according to IEC 60250.

Comparative Example 1 shows the most widely used system in industry: BADGE/MHHPA/BDMA. The main problems of Comparative Example 1 are the REACH issues about MHHPA and the fact that the accelerator BDMA is regarded to be toxic. Further, there is a desire to reduce the tan delta as required by new standards and further reduce the viscosity for more easy impregnation.

Comparative Example 2 is a system that avoids the toxicity issues of BDMA, but also contains MHHPA. Therefore, it is no solution to the main issue. Further it has an even higher tan delta compared to Comparative Example 1.

The most simple idea to the person skilled in the art of formulation RIP systems might be just to exchange BADGE/MHHPA/BDMA with MTHPA instead of MHHPA. Comparative Example 3, however, shows that this would not work because the Tg would be by far too low.

By increasing the amount of BDMA, the Tg may be increased to the desired level, however, then the reactivity is increased too much and such systems would be by far too reactive to be useful for the targeted applications, such as for example, impregnation systems for resin impregnated paper bushings (the reaction enthalpy would be released too quickly to let it disappear and thus the material temperature would rise too high which leads to overheating and cracks).

Example 1 of the present disclosure shows a way that works in all respects. Combining selected types of BADGE and BFDGE to form a resin mixture and curing the resin mixture with MTHPA, accelerated by a small amounts (<0.2%) of tertiary alkylamine aminoethylalcohols or ethers thereof, such as the preferred catalyst JEFFCAT® ZF 10 accelerator, instead of BDMA, results in a cost efficient system that is low viscous, sufficiently low reactive (to prevent overheating in the final application), resulting in a Tg>120° C., providing the desired low tan delta of <0.3%, and free of materials currently labeled as toxic substances by, such as MHHPA and free bisphenol A. Being free of such toxic materials should render the presently disclosed composition as REACH compliant. Additional, the presently disclosed composition delivers a better mechanical profile than the presently most widely used system of Comparative Example 1.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A curable mixture comprising (i) a resin mixture comprising a bisphenol-A-diglycidylether (BADGE) and a bisphenol-F-diglycidylether (BFDGE), (ii) methyltetrahydrophthalic anhydride (MTHPA), and (iii) an accelerator selected from N,N,N'-trimethyl-N'-hydroxyethyl-bisaminoethyl ether, N-(3-dimethylaminopropyl)-N, N-diisopropanolamine, N,N-bis(3-dimethylaminopropyl)-N-isopropanolamine, and a mixture thereof wherein the curable mixture contains less than 0.2 pbw of the accelerator based on 100 pbw of the resin mixture.

2. The curable mixture according to claim 1, wherein the epoxy index according to ISO 3001 of the BADGE is in the range between 3 and 5 eq/kg.

3. The curable mixture according to claim 2, wherein the epoxy index according to ISO 3001 of the BADGE is in a range between 3.5 and 4.5 eq/kg.

4. The curable mixture according to claim 1, wherein the epoxy index according to ISO 3001 of the BFDGE is in a range between 5 and 6.45 eq/kg.

5. The curable mixture according to claim 4, wherein the epoxy index according to ISO 3001 of the BFDGE is in a range between 5.3 and 6.3 eq/kg.

6. The curable mixture according to claim 1, wherein the BADGE and the BFDGE are present in the resin mixture at a weight ratio between 1:10 and 10:1.

7. The curable mixture according to claim 1, wherein the curable mixture contains MTHPA in an amount corresponding to 80 wt. % to 120 wt. % of the stoichiometric amount based on the resin mixture.

8. The curable mixture according to claim 7, wherein the curable mixture contains MTHPA in amount corresponding to the stoichiometric amount based on the resin mixture.

9. The curable mixture according to claim 1, wherein the curable mixture contains the accelerator in an amount ranging from 0.01 to 0.10 pbw based on 100 pbw of the resin mixture.

10. A paper bushing impregnated with a curable mixture according to claim 1.

11. The paper bushing according to claim 10, wherein the paper bushing is a bushing for high-voltage application.

12. A curable mixture comprising (i) a resin mixture comprising a bisphenol-A-diglycidylether (BADGE) and a bisphenol-F-diglycidylether (BFDGE), (ii) methyltetrahydrophthalic anhydride (MTHPA), and (iii) N,N,N'-trimethyl-N'-hydroxyethyl-bisaminoethyl ether wherein the curable mixture contains less than 0.2 pbw of N,N,N'-trimethyl-N'-hydroxyethyl-bisaminoethyl ether based on 100 pbw of the resin mixture.

13. A paper bushing impregnated with a curable mixture according to claim 12.

14. The paper bushing according to claim 13, wherein the paper bushing is a bushing for high-voltage application.

* * * * *